United States Patent
Liu et al.

(10) Patent No.: US 7,923,975 B2
(45) Date of Patent: Apr. 12, 2011

(54) ANALOG VARIABLE-FREQUENCY CONTROLLER AND SWITCHING CONVERTER THEREWITH

(75) Inventors: Jia-Ming Liu, Fengyuan (TW);
Yeong-Chau Kuo, Kaohsiung (TW);
Tai-Haur Kuo, Tainan (TW)

(73) Assignees: Megawin Technology Co., Ltd., Hsinchu (TW); NCKU Research and Development Foundation, Tainan (TW)

( * ) Notice: Subject to any disclaimer, the term of this patent is extended or adjusted under 35 U.S.C. 154(b) by 36 days.

(21) Appl. No.: 12/553,383

(22) Filed: Sep. 3, 2009

(65) Prior Publication Data
US 2010/0134079 A1    Jun. 3, 2010

(30) Foreign Application Priority Data
Nov. 28, 2008    (TW) ................................ 97146318 A

(51) Int. Cl.
*G05F 1/613*    (2006.01)
*G05F 1/00*    (2006.01)

(52) U.S. Cl. ......................... 323/224; 323/283; 323/284

(58) Field of Classification Search ................. 323/224, 323/283, 282, 284
See application file for complete search history.

(56) References Cited

U.S. PATENT DOCUMENTS
6,871,289 B2 *    3/2005    Pullen et al. .................. 713/300
* cited by examiner

*Primary Examiner* — Shawn Riley
(74) *Attorney, Agent, or Firm* — Muncy, Geissler, Olds & Lowe, PLLC

(57) ABSTRACT

An analog variable-frequency controller includes a first current generator, a second current generator, a clock generator and a light/heavy load selector. The first and second current generator receive a load current signal and then output a first voltage signal and a second voltage signal, respectively. The clock generator generates a corresponding switching frequency according to the first voltage signal or the second voltage signal. The light/heavy load selector, connected with the first current generator, the second current generator and the clock generator, receives a control signal for controlling the clock generator to receive the first voltage signal or the second voltage signal. The abovementioned controller is implemented by an analog circuit, which has a lower circuit complexity, lower cost and is easy to be integrated into a switching converter.

23 Claims, 6 Drawing Sheets

ANALOG VARIABLE-FREQUENCY CONTROLLER AND SWITCHING CONVERTER THEREWITH

BACKGROUND OF THE INVENTION

1. Field of the Invention

The present invention relates to a controller and a switching converter, and more particularly to an analog variable-frequency controller and the switching converter therewith.

2. Description of the Related Art

Battery-powered electronic devices, such as cell phones, digital personal assistants etc., often require highly efficient DC-DC switching converters to convert battery voltage to the required operating voltage with voltage regulation. This type of converters needs to work over wide load current range. Therefore, it is very important to maintain high power efficiency in such a wide range.

A pulse frequency modulation (PFM) of a prior art may be used to increase the power efficiency by varying the switching frequency. However, pulse frequency modulation can only improve the light-load power efficiency but not the heavy-load power efficiency. An adaptive frequency control method of another prior art can adaptively select the switching frequency for a given load to minimize the input power to increase the power efficiency. Referring to FIG. 1a, by adapting the switching frequency based on the load current, an optimized power efficiency, as shown in FIG. 1b, is obtained. However, this method is implemented by an analog to digital converter to calculate the input voltage/current and a digital control circuit to select the switching frequency, which leads to a complicated circuit of high implementation cost and larger controller power-loss.

In summary, it is highly desirable that a controller with a more simple circuit and without an analog to digital converter is capable of generating a variable-frequency control signal depending on system load to achieve the optimized power efficiency of a switching converter.

SUMMARY OF THE INVENTION

The present invention is directed to an analog variable-frequency controller and a switching converter, which employs the analog circuit to receive a load current signal, and adjust the switching frequency depending on the load current signal to achieve the optimized converter power efficiency. Therefore, the circuit may be comparatively less complex, and may have lower implementation cost and may be more easily integrated into the switching converter.

In one embodiment, the proposed analog variable-frequency controller includes a first current generator which receives a load current signal and outputs a corresponding first voltage signal; a second current generator which receives the load current signal and outputs a corresponding second voltage signal; a clock generator which, based on the first voltage signal or the second voltage signal, generates a corresponding switching frequency signal; and a light/heavy load selector, which is electrically connected to the first current generator, the second current generator and the clock generator, and receives a control signal to control the clock generator to select receiving the first voltage signal or the second voltage signal.

In another embodiment, the proposed switching converter includes an output circuit; a feedback circuit, which generates a first pulse width modulation signal according to the operating state of the output circuit; a current sensor, which detects the output circuit to output a load current signal; an analog variable-frequency controller as described above; and a first SR latch comprising a R terminal for receiving the first pulse width modulation signal, a S terminal for receiving a switching frequency signal, and an output terminal for outputting a second pulse width modulation signal to control the operating state of the output circuit.

BRIEF DESCRIPTION OF THE DRAWINGS

The objectives, technical contents and characteristics of the present invention can be more fully understood by reading the following detailed description of the preferred embodiments, with reference made to the accompanying drawings, wherein.

DETAILED DESCRIPTION OF THE INVENTION

Figure 1A:
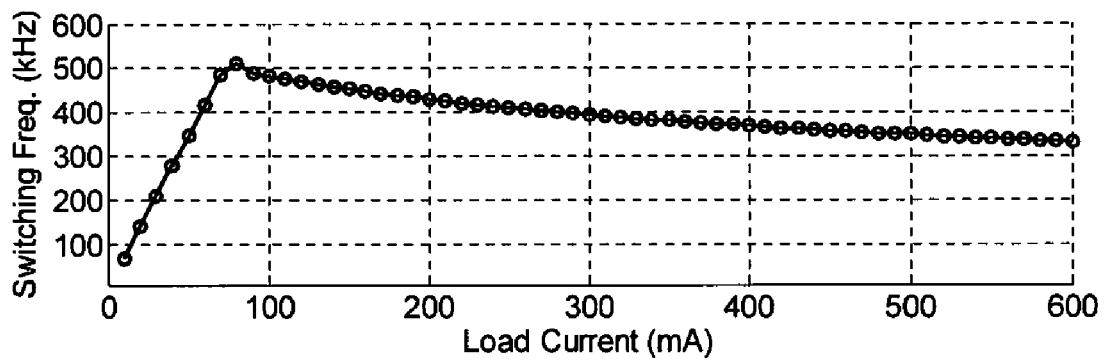
FIG. 1a and FIG. 1b schematically illustrate a relationship between a load current and a switching frequency, and a relationship between a load current and an optimized power efficiency, respectively.
Figure 1B:
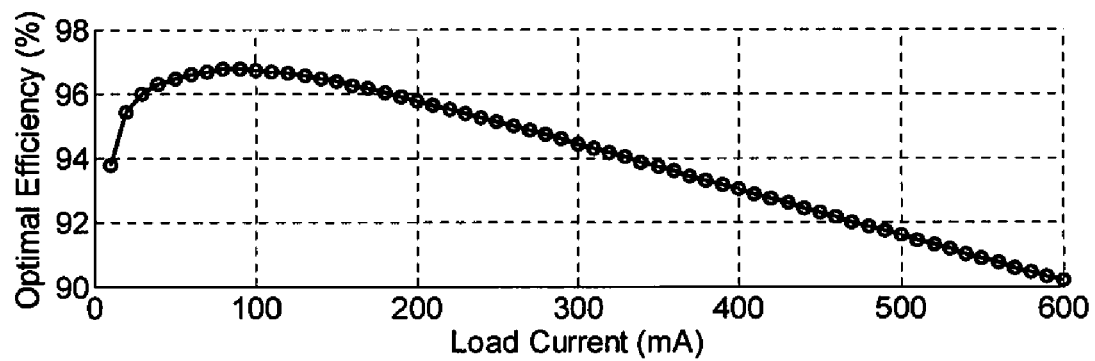
Figure 2:
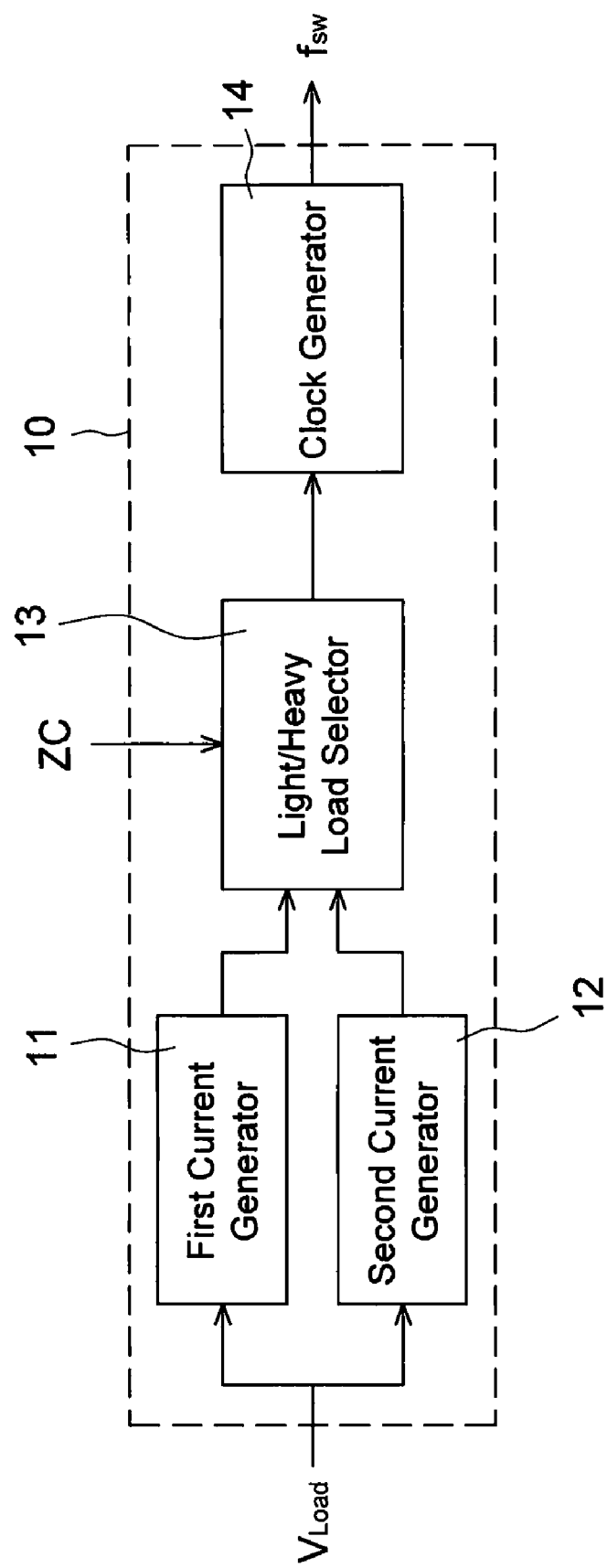
FIG. 2 is a block diagram schematically illustrating an analog variable-frequency controller according to one embodiment of the present invention.

Referring to FIG. 2, the analog variable-frequency controller 10 according to one embodiment, includes a first current generator 11, a second current generator 12, a clock generator 14 and a light/heavy load selector 13. The first current generator 11 receives a load current signal $V_{Load}$ and outputs a corresponding first voltage signal; and the second current generator 12 also receives the load current signal $V_{Load}$ and outputs a corresponding second voltage signal. The light/heavy load selector 13 is electrically connected to the first current generator 11, the second current generator 12 and the clock generator 14. The light/heavy load selector 13 receives a control signal ZC to control the clock generator 14 to select receiving the first voltage signal output by the first current generator or the second voltage signal output by the second current generator. The clock generator 14, based on the first voltage signal or the second voltage signal, generates a corresponding switching frequency signal $f_{SW}$.

In one embodiment, the switching frequency signal $f_{SW}$ output by the clock generator 14 receiving the first voltage signal output by the first current generator 11 is positively correlated with the first voltage signal, i.e. the larger the first voltage signal, the faster the switching frequency $f_{SW}$. On the other hand, the switching frequency signal $f_{SW}$ output by the clock generator 14 receiving the second voltage signal output by the second current generator 12 is negatively correlated with the second voltage signal, i.e. the larger the second voltage signal, the slower the switching frequency signal $f_{SW}$. According to the aforementioned description, the analog variable-frequency controller 10, according to an embodiment, can generate optimized switching frequency signals $f_{SW}$ for both light-load and heavy-load operations.

Figure 3:
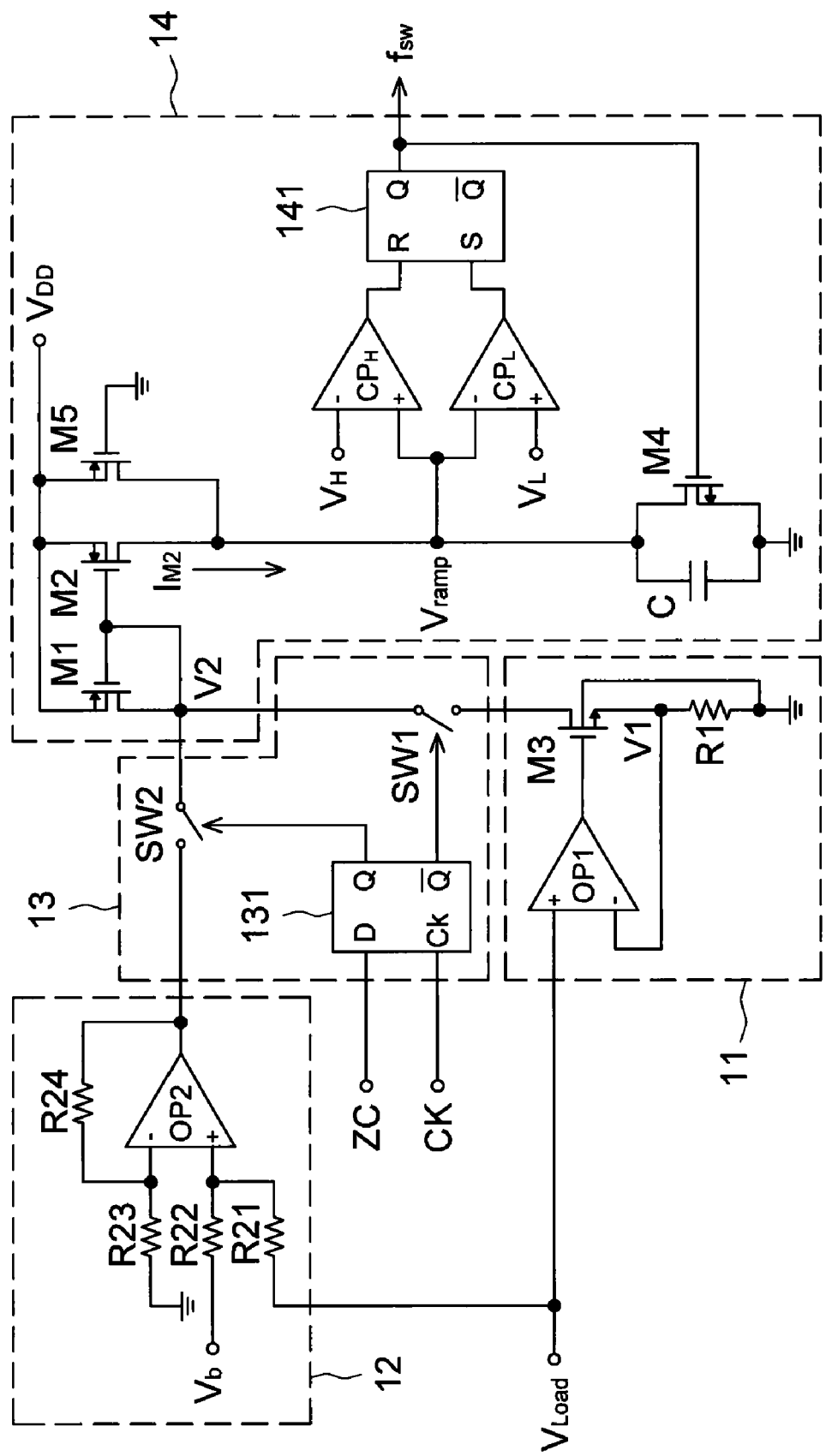
FIG. 3 is a circuit diagram schematically illustrating an analog variable-frequency controller according to one embodiment of the present invention.

The following embodiment is intended to illustrate the analog variable-frequency controller 10, however, it is not intended to limit the scope of the present invention. Referring to FIG. 3, the clock generator 14 includes a first P-type channel metal oxide semiconductor field effect (PMOS) transistor M1, a second PMOS transistor M2, a first comparator $CP_H$, a second comparator $CP_L$, a capacitor C, an SR latch 141 and a discharge switch M4. The source of the first PMOS transistor M1 is electrically connected to a voltage source $V_{DD}$, its drain is electrically connected to the light/heavy load selector 13, and its gate is electrically connected to its drain. The source of the second PMOS transistor M2 is electrically connected to the voltage source $V_{DD}$, and its gate is electrically connected to the gate of the first PMOS transistor M1 to form a current mirror circuit.

In continuation to the aforementioned description, the non-inverting input terminal of the first comparator $CP_H$ is electrically connected to the drain of the second PMOS transistor M2, and its inverting input terminal is electrically connected to a high voltage reference $V_H$. The inverting input terminal of the second comparator $CP_L$ is electrically connected to the gate of the second PMOS transistor M2, and its non-inverting terminal is electrically connected to a low voltage reference $V_L$. One terminal of the capacitor C is electrically connected to the drain of the second PMOS transistor M2, and the other terminal of the capacitor C is connected to ground. The R terminal of the SR latch 141 is electrically connected to the output terminal of the first comparator $CP_H$, its S terminal is electrically connected to the output terminal of the second comparator $CP_L$, and its output terminal outputs the switching frequency $f_{SW}$. The discharge switch M4 is electrically connected to the output terminal of the SR latch 141, and it is opened or closed by the switching frequency signal $f_{SW}$ to charge or discharge the capacitor C.

In one embodiment, the clock generator 14 further includes a third PMOS transistor M5. The source of the third PMOS transistor M5 is electrically connected to the voltage source $V_{DD}$, its drain is electrically connected to the drain of the second PMOS transistor M2, and its gate is connected to ground.

The first current generator 11 includes a first operational amplifier OP1, an N-type channel metal oxide semiconductor field effect (NMOS) transistor M3 and a first resistor R1. The non-inverting input terminal of the first operational amplifier OP1 receives the load current signal $V_{Load}$. The gate of the NMOS transistor M3 is electrically connected to the output terminal of the first operational amplifier OP1, its source is electrically connected to the inverting input terminal of the first operational amplifier OP1, and its drain is electrically connected to the light/heavy load selector 13. One terminal of the first resistor R1 is electrically connected to the source of the NMOS transistor M3, and the other terminal is connected to ground.

The second current generator 12 includes a plurality of second resistors R21, R22, R23, R24 and a second operational amplifier OP2. The non-inverting input terminal of the second operational amplifier OP2 receives the load current signal $V_{Load}$ via the second resistor R21, and a voltage bias $V_b$ via the second resistor R22; its inverting input terminal is connected to ground via the second resistor R23; and its output terminal is electrically connected to the inverting input terminal via the second resistor R24, and to the light/heavy load selector 13.

The light/heavy load selector 13 includes a D flip-flop 131, a first switch SW1 and a second switch SW2. The D flip-flop 131 is driven by a control signal ZC and a clock signal CK. The first switch SW1 is electrically connected to the inverting output terminal of the D flip-flop 131, and it connects or disconnects between the first current generator 11 and the clock generator 14 based on the output signal from the inverting output terminal of the D flip-flop 131. The second switch SW2 is electrically connected to the output terminal of D flip-flop 131 and it connects or disconnects between the second current generator 12 and the clock generator 14 based on the output signal from the output terminal of the D flip-flop 131.

According to the embodiment illustrated in FIG. 3, the operations of the analog variable-frequency controller 10 is described below. When the system is operating under light-load mode, the first switch SW1 of the light/heavy load selector 13 is closed, and the second switch SW2 is opened. Meanwhile, the first current generator 11 is activated. The voltage level of node V1 can be matched to a voltage level close to the load current signal $V_{Load}$ by virtue of the virtual short property of the first operational amplifier OP1. Because the voltage drop across the first resistor R1 is $V_{Load}$, the current flowing through the first resistor is $V_{Load}/R1$. Such current further causes the current mirror circuit, composed of a first PMOS transistor M1 and a second PMOS transistor M2, in the clock generator, to generate a current $I_{M2}$ flowing through the second PMOS transistor M2. The current $I_{M2}$, flowing through the second PMOS transistor M2, charges the capacitor C, which causes the voltage at node $V_{ramp}$ to have a rising waveform of slope equal to $I_{M2}/C$.

In continuation to the abovementioned description, when the voltage level of node $V_{ramp}$ reaches the high voltage reference $V_H$, the first comparator $CP_H$ responds, causing the SR latch 141 to close the discharge switch M4 and discharges the capacitor C. When the voltage level of node $V_{ramp}$ drop to the low voltage reference $V_L$, the second comparator $CP_L$ responds, causing the SR latch 141 to open the discharge switch M4, and charge the capacitor C. When such process is constantly repeated, the switching frequency signal $f_{SW}$ is generated from the output terminal of the SR latch 141. The switching frequency signal $f_{SW}$, when the system is operating under light-load mode, can be expressed by a following equation:

$$f_{SW} = \frac{V_{Load}}{R1 \cdot C \cdot (V_H - V_L)} \cdot \frac{(W/L)_{M2}}{(W/L)_{M1}} \quad (1)$$

wherein $(W/L)_{M1}$ and $(W/L)_{M2}$ are the ratios of the dimensions of the first and second PMOS transistors (M1, M2) respectively. According to expression (1), when the system is operating under light-load mode, the larger the load current signal $V_{Load}$, the faster the switching frequency signal $f_{SW}$. In one embodiment, when the load current signal $V_{Load}$ is 0, the current flowing through the third PMOS transistor M5 causes the clock generator 14 to maintain outputting a certain switching frequency signal $f_{SW}$.

When the system is operating under heavy-load mode, the first switch SW1 of the light/heavy load selector 13 is opened, and the second switch SW2 is closed. Meanwhile, the second current generator 12 is activated. The second current generator 12 includes a scaling network, and the voltage level at the node $V_2$ connected to the output of the scaling network can be expressed by a following equation:

$$V2 = a \times V_{Load} + b \times V_b \tag{2}$$

wherein coefficients a and b may be expressed as follows:

$$a = \frac{R23 + R24}{R23} \cdot \frac{R22}{R21 + R22} \tag{3}$$

$$b = \frac{R23 + R24}{R23} \cdot \frac{R21}{R21 \cdot R22} \tag{4}$$

According to expression (3) and (4), designers may simply adjust ratios R21/R22 and R23/R24 to obtain coefficients a and b for different design parameters.

According to expression (2), when the system is operating under heavy-load mode, the larger the load current signal $V_{Load}$, the higher the voltage level of the node V2, causing the current flowing through the second PMOS transistor M2 to decrease, and the voltage level of node $V_{ramp}$ to rise more slowly, and thus, a slower switching frequency signal $f_{SW}$.

Figure 4:
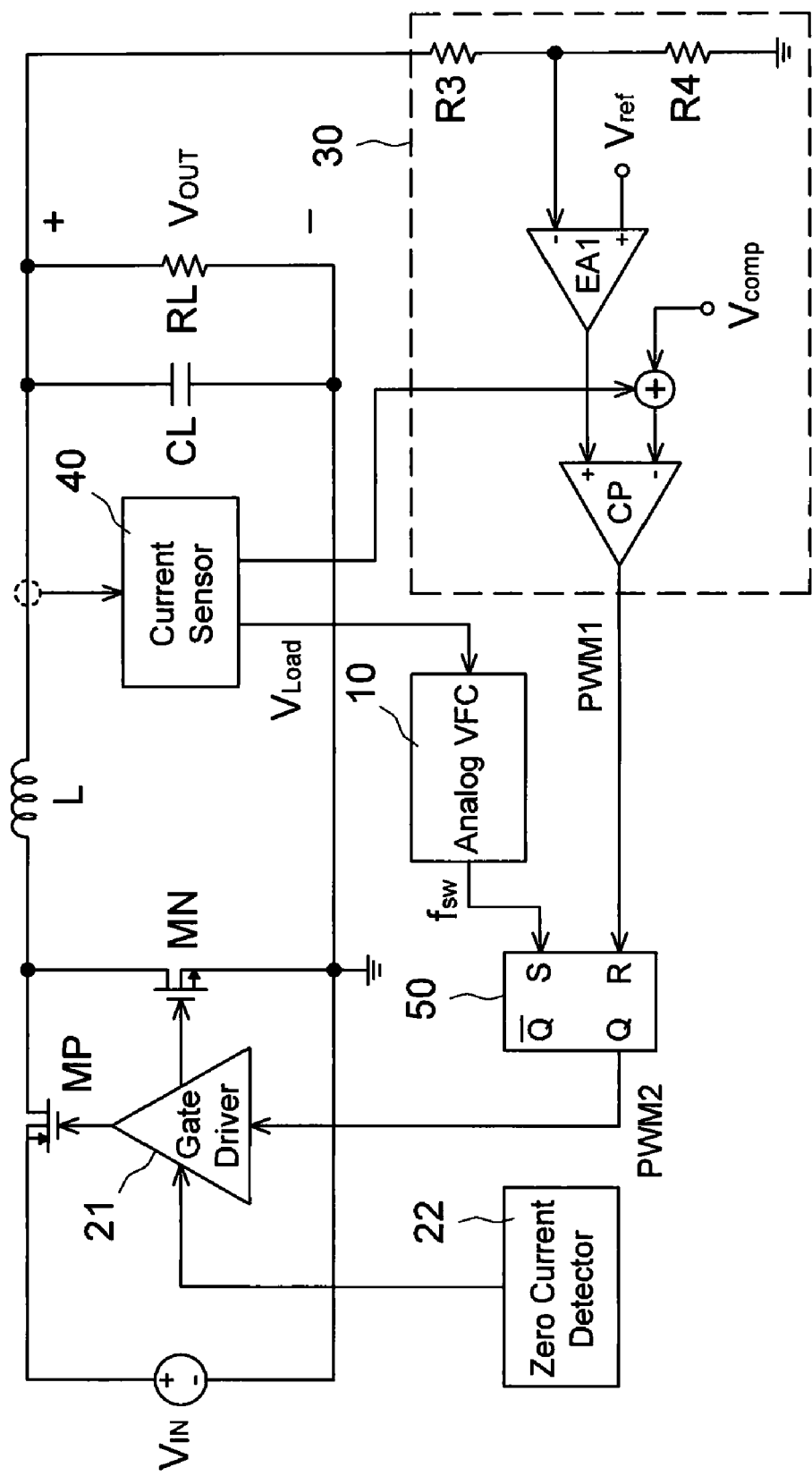
FIG. 4 is a circuit diagram schematically illustrating a DC-DC switching converter according to one embodiment of the present invention.

FIG. 4 illustrates an exemplificative of application of the analog variable-frequency controller 10 to a switching converter. The embodiment illustrated in FIG. 4 is a DC-DC switching converter which comprises an output circuit, a feedback circuit 30, a current sensor 40, an analog variable-frequency controller 10 and an SR latch 50. The output circuit comprises two power transistors MN and MP, a gate driver 21 driving the power transistors MN and MP, an inductor L, a capacitor CL and a load resistor RL. The abovementioned components can be connected according to prior arts. Besides, a zero current detector 22 is employed to detect the occurrence of output current flowing back to a transistor to turn off the transistor MN. Such occurrence is also used to determine whether the system should choose light-load or heavy-load mode.

The feedback circuit 30 generates a first pulse width modulation signal PWM1 according to the operating state of the output circuit. For example, resistors R3 and R4 are feedback factors which voltage divides the output voltage $V_{out}$ and this voltage is compared with a voltage reference $V_{ref}$ via an error amplifier EA1. The output of the error amplifier EA1 is compared with the sum of the compensation voltage ramp $V_{COMP}$ and the inductor voltage detected by the current sensor 40 when the power transistor MP is turned on via comparator CP to determine the pulse width of the first pulse width modulation signal PWM1, which is output to the R terminal of the SR latch 50.

The current sensor 40 also detects the output circuit to generate a load current signal $V_{Load}$. The analog variable frequency controller 10 receives the load current signal $V_{Load}$ and the control signal ZC output by the zero current detector 22 to generate the switching frequency signal $f_{SW}$, which is connected to the S terminal of the SR latch 50. The SR latch 50, based on the first pulse width modulation signal PWM1 and the switching frequency signal $f_{SW}$, outputs a second pulse width modulation signal PWM2, which is sent back to the gate driver 21 to drive power transistors MN and MP to control the operating state of the output circuit. The operations and components of the analog variable-frequency controller 10 have been described above, and are not repeated here.

In one embodiment, the switching converter can be a buck, boost or buck-boost converter. Moreover, the feedback control of the switching converter can be voltage-mode control or current-model control.

Figure 5A:
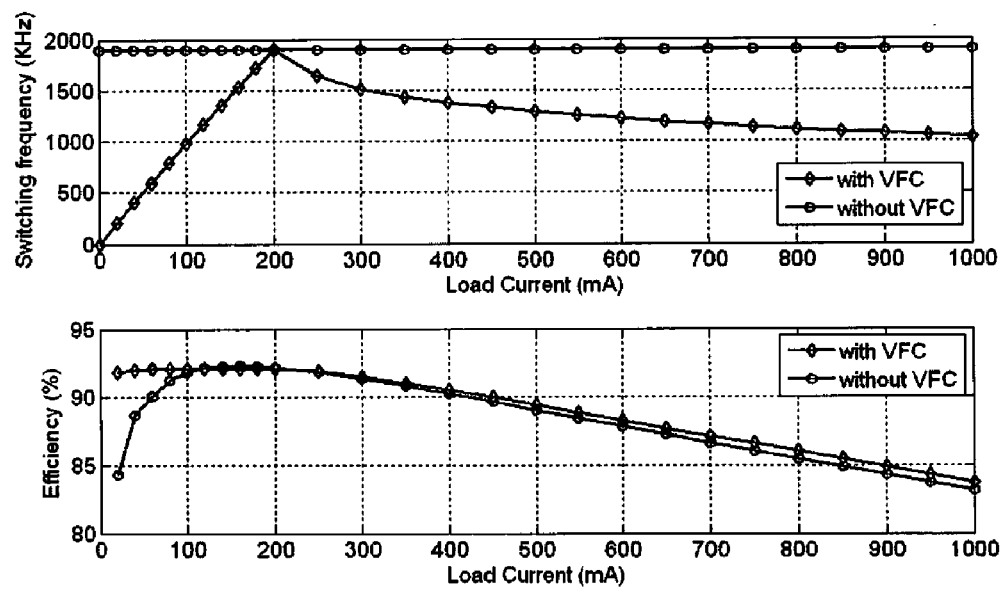
FIG. 5a schematically illustrates a relationship between a load current and a switching frequency, and a relationship between a load current and a power efficiency of a DC-DC switching converter according to an embodiment of the present invention.
Figure 5B:
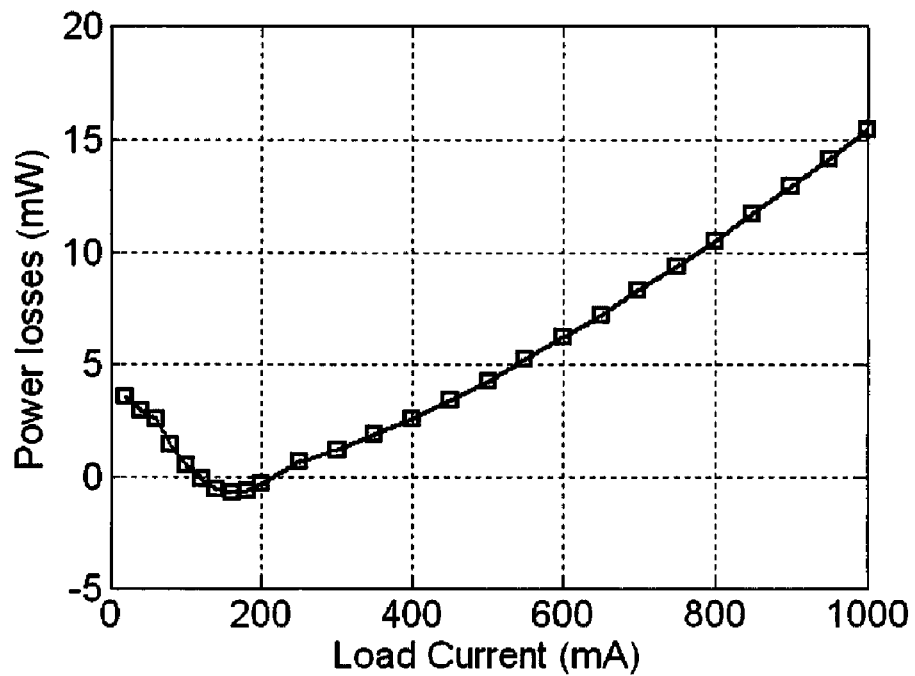
FIG. 5b schematically illustrates the relationship between a load current and an improved power loss of a DC-DC switching converter according to an embodiment of the present invention.

Referring to FIG. 5a and FIG. 5b, in comparison to fixed frequency control ("without VFC" legend in FIG. 5a), the DC-DC switching converter adopting the analog variable-frequency controller ("with VFC" legend in FIG. 5a) may achieve a better power efficiency. For example, when the DC-DC switching converter is operating under light-load mode (load current is roughly smaller than 80 mA), if the load current is increased, the switching frequency is also increased to achieve better power efficiency; when under heavy-load operation (load current is roughly larger than 80 mA), if the load current is increased, the switching frequency is decreased to achieve a better power efficiency. In addition, the DC-DC switching converter, according to an embodiment, may not only improve the power efficiency under light-load mode, but may also improve the power efficiency under heavy-load mode, as illustrated in FIG. 5b.

Figure 6A:
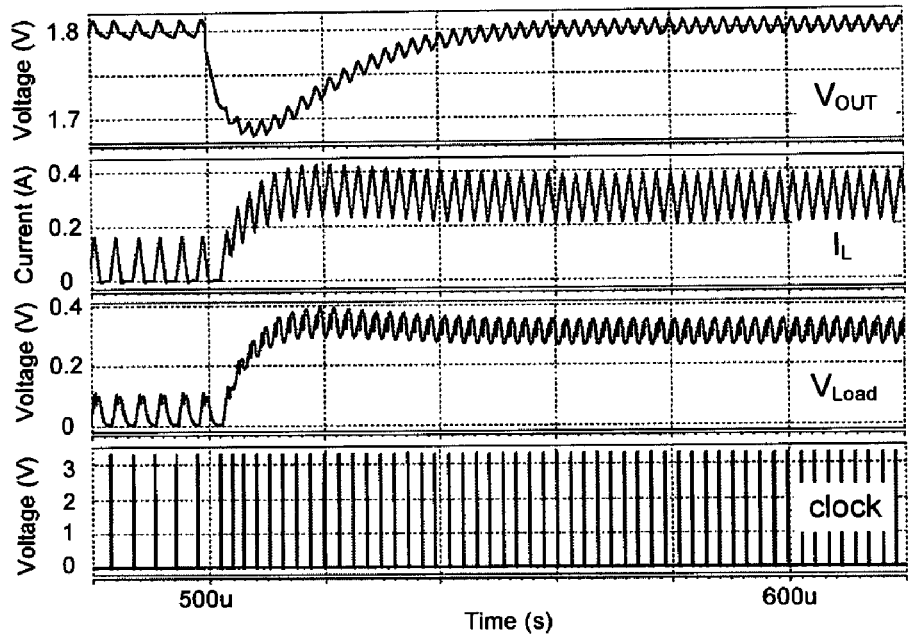
FIG. 6a and FIG. 6b schematically illustrate a transient response of a DC-DC switching converter according to an embodiment of the present invention.
Figure 6B:
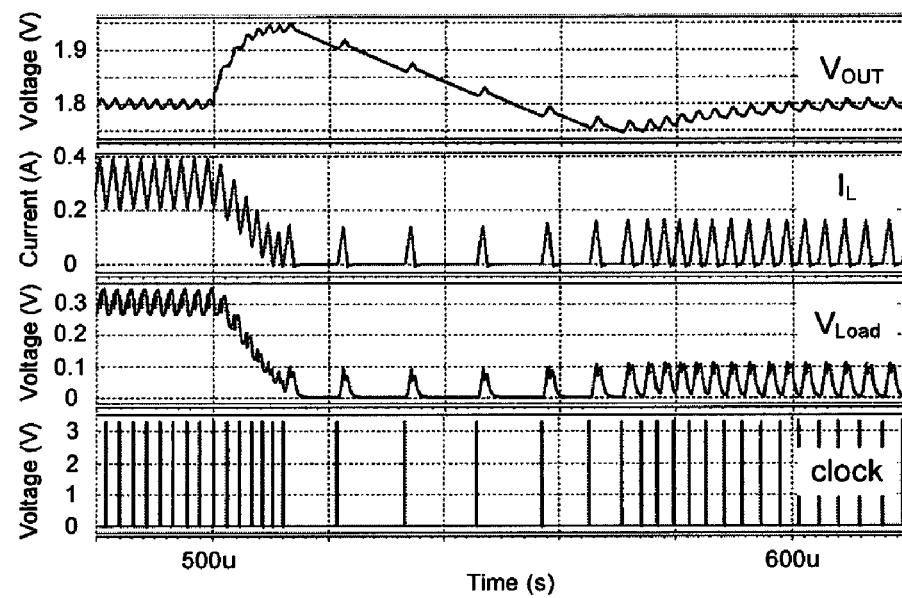

FIG. 6a and FIG. 6b illustrate a transient response of the DC-DC switching converter with the analog variable-frequency controller 10. FIG. 6a illustrates a transition from operating under light-load mode to heavy-load mode; and FIG. 6b illustrates a transition from operating under heavy-load mode to light-load mode, wherein $V_{OUT}$ is the output voltage, $I_L$ is the current flowing through the inductor L, $V_{Load}$ is the load current signal, and clock is the switching frequency signal $f_{SW}$.

In conclusion, the analog variable-frequency controller and switching converter employs an analog circuit to receive a load current signal and adjusts the switching frequency based on the load current signal to achieve optimized converter power efficiency. Since the present invention may be implemented by an analog circuit, and as the complexity of the analog circuit is more simple, and therefore implementation cost are lower, and is more easily integrated to a switching converter.

The embodiments described above are to demonstrate the technical contents and characteristics of the preset invention to enable the persons skilled in the art to understand, make, and use the present invention. However, it is not intended to limit the scope of the present invention. Therefore, any equivalent modification or variation according to the spirit of the present invention is to be also included within the scope of the present invention.

What is claimed is:

1. An analog variable-frequency controller comprising:
   a first current generator, for receiving a load current signal and outputting a corresponding first voltage signal;
   a second current generator, for receiving said load current signal and outputting a corresponding second voltage signal;
   a clock generator, for generating a corresponding switching frequency signal based on said first voltage signal or said second voltage signal; and
   a light/heavy load selector, electrically connected to said first current generator, said second current generator and said clock generator, receiving a control signal to control said clock generator to select receiving said first voltage signal or said second voltage signal.

2. The analog variable-frequency controller according to claim 1, wherein said switching frequency signal and said first voltage signal are positively correlated.

3. The analog variable-frequency controller according to claim 1, wherein said switching frequency signal and said second voltage signal are negatively correlated.

4. The analog variable-frequency controller according to claim 1, wherein said control signal is generated by a zero current detector.

5. The analog variable-frequency controller according to claim 1, wherein said clock generator comprises:
- a first PMOS transistor, comprising a source electrically connected to a voltage source, a drain electrically connected to said light/heavy load selector, and a gate electrically connected to said drain.
- a second PMOS transistor, comprising a source electrically connected to said voltage source, a gate electrically connected to said gate of said first PMOS transistor to form a current mirror circuit;
- a first comparator, comprising a non-inverting input terminal electrically connected to a drain of said second PMOS transistor, and a inverting input terminal electrically connected to a high voltage reference;
- a second comparator, comprising an inverting input terminal electrically connected to said drain of said second PMOS transistor, and a non-inverting input terminal electrically connected to a low voltage reference;
- a capacitor, comprising one terminal electrically connected to said drain of said second PMOS transistor and another terminal connected to ground;
- an SR latch, comprising a R terminal electrically connected to an output terminal of said first comparator, a S terminal electrically connected to an output terminal of said second comparator, and an output terminal for outputting said switching frequency signal; and
- a discharge switch, electrically connected to an output terminal of said SR latch, and being opened or closed by said switching frequency signal to charge or discharge said capacitor.

6. The analog variable-frequency controller according to claim 5, wherein said clock generator comprises:
- a third PMOS transistor, comprising a source electrically connected to said voltage source, a drain electrically connected to said drain of said second PMOS transistor, and a gate connected to ground.

7. The variable-frequency controller according to claim 1, wherein said light/heavy load selector comprises:
- a D flip-flop, driven by said control signal and a clock signal;
- a first switch, electrically connected to an inverting output terminal of said D flip-flop, controlled by an output signal from said inverting output terminal to connect or disconnect between said first current generator and said clock generator; and
- a second switch, electrically connected to an output terminal of said D flip-flop, controlled by an output signal from said output terminal to connect or disconnect between said second current generator and said clock generator.

8. The analog variable-frequency controller according to claim 1, wherein said first current generator comprises:
- a first operational amplifier, comprising a non-inverting input terminal receives said load current signal;
- an NMOS transistor, comprising a gate electrically connected to an output terminal of said first operational amplifier, a source electrically connected to said inverting input terminal of said first operational amplifier, and a drain electrically connected to said light/heavy load selector; and
- a first resistor, comprising one terminal electrically connected to said source of said NMOS transistor, and another terminal connected to ground.

9. The analog variable-frequency controller according to claim 1, wherein said second current generator comprises:
- a plurality of second resistors; and
- a second operational amplifier, comprising a non-inverting input terminal receiving said load current signal via one of said second resistors, and a voltage bias via one of said second resistors, an inverting terminal connected to ground via another said second resistors, and an output terminal electrically connected to said inverting terminal via one of said second resistors, and to said light/heavy load selector.

10. The analog variable-frequency controller according to claim 1 applied to a switching converter.

11. The analog variable-frequency controller according to claim 10, wherein said switching converter comprises a buck, boost or buck/boost converter.

12. The analog variable-frequency controller according to claim 10, wherein said feedback control of said switching converter comprises voltage-mode control or current-mode control.

13. A switching converter comprising:
- an output circuit;
- a feedback circuit, for generating a first pulse width modulation signal according to the operating state of said output circuit;
- a current sensor, for detecting said output circuit to output a load current signal;
- an analog variable-frequency controller comprising:
  - a first current generator, for receiving said loading current signal and outputting a corresponding first voltage signal;
  - a second current generator, for receiving said loading current signal and outputting a corresponding second voltage signal;
  - a clock generator, for generating a corresponding switching frequency signal based on said first voltage signal or said second voltage signal; and
  - a light/heavy load selector, electrically connected to said first current generator, said second current generator and said clock generator, and for receiving a control signal to control said clock generator to select receiving said first voltage signal or said second voltage signal; and
- a first SR latch, comprising a R terminal receiving said first pulse width modulation signal, a S terminal receiving said switching frequency signal, and an output terminal outputting a second pulse width modulation signal to control said operating state of said output circuit.

14. The switching converter according to claim 13, wherein said switching frequency signal and said first voltage signal are positively correlated.

15. The switching converter according to claim 13, wherein said switching frequency signal and said second voltage signal are negatively correlated.

16. The switching converter according to claim 13, wherein said control signal is generated by a zero current detector.

17. The switching converter according to claim 13, wherein said clock generator comprises:
- a first PMOS transistor, comprising a source electrically connected to a voltage source, a drain electrically connected to said light/heavy load selector, and a gate electrically connected to said drain;
- a second PMOS transistor, comprising a source electrically connected to said voltage source, a gate electrically connected to said gate of said first PMOS transistor to form a current mirror circuit;

a first comparator, comprising a non-inverting input terminal electrically connected to said drain of said second PMOS transistor, and an inverting input terminal electrically connected to a high voltage reference;

a second comparator, comprising a inverting input terminal electrically connected to said drain of said second PMOS transistor, and a non-inverting input terminal electrically connected to a low voltage reference;

a capacitor, comprising one terminal electrically connected to said drain of said second PMOS transistor and another terminal connected to ground;

a second SR latch, comprising a R terminal electrically connected to an output terminal of said first comparator, a S terminal electrically connected to an output terminal of the second comparator, and an output terminal outputting said switching frequency signal; and a discharge switch, electrically connected to an output terminal of said second SR latch, being opened or closed by said switching frequency signal to charge or discharge said capacitor.

18. The switching converter according to claim 17, wherein said clock generator comprises:

a third PMOS transistor, comprising a source electrically connected to said voltage source, a drain electrically connected to said drain of said second PMOS transistor, and a gate connected to ground.

19. The switching converter according to claim 13, wherein said light/heavy load selector comprises:

a D flip-flop, driven by said control signal and a clock signal;

a first switch, electrically connected to an inverting output terminal of said D flip-flop, controlled by an output signal from said inverting output terminal to connect or disconnect between said first current generator and said clock generator; and a second switch, electrically connected to an output terminal of said D flip-flop, controlled by an output signal from said output terminal to connect or disconnect between said second current generator and said clock generator.

20. The switching converter according to claim 13, wherein said first current generator comprises:

a first operational amplifier, comprising a non-inverting input terminal receiving said load current signal;

an NMOS transistor, comprising a gate electrically connected to the output terminal of said first operational amplifier, a source electrically connected to an inverting input terminal of said first operational amplifier, and a drain electrically connected to said light/heavy load selector; and a first resistor, comprising one terminal electrically connected to said source of said NMOS transistor, and another terminal is connected to ground.

21. The switching converter according to claim 13, wherein said second current generator comprises:

a plurality of second resistors; and a second operational amplifier, comprising a non-inverting input terminal receiving said load current signal via one of said second resistors and a voltage bias via another said second resistors, an inverting terminal connected to ground via one of said second resistors, and an output terminal electrically connected to said inverting terminal via one of said second resistors, and to said light/heavy load selector.

22. The switching converter according to claim 13, further comprising a buck, boost or buck/boost converter.

23. The switching converter according to claim 13, wherein said feedback control comprises voltage-mode control or current-mode control.

* * * * *